United States Patent
Satou

(10) Patent No.: US 10,761,593 B2
(45) Date of Patent: Sep. 1, 2020

(54) POWER CONTROL SYSTEM AND POWER CONTROL PROGRAM

(71) Applicant: FUJITSU LIMITED, Kawasaki-shi, Kanagawa (JP)

(72) Inventor: Takashi Satou, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 139 days.

(21) Appl. No.: 16/202,287

(22) Filed: Nov. 28, 2018

(65) Prior Publication Data
US 2019/0171277 A1    Jun. 6, 2019

(30) Foreign Application Priority Data

Dec. 5, 2017  (JP) .................................. 2017-233580

(51) Int. Cl.
| | |
|---|---|
| *G06F 1/3287* | (2019.01) |
| *G06F 1/324* | (2019.01) |
| *G06F 1/3234* | (2019.01) |
| *G06F 1/3296* | (2019.01) |
| *G06F 1/3206* | (2019.01) |
| *G06F 1/20* | (2006.01) |

(52) U.S. Cl.
CPC ............ *G06F 1/3287* (2013.01); *G06F 1/324* (2013.01); *G06F 1/3206* (2013.01); *G06F 1/3275* (2013.01); *G06F 1/3296* (2013.01); *G06F 1/20* (2013.01)

(58) Field of Classification Search
CPC ...... G06F 1/3287; G06F 1/3206; G06F 1/324; G06F 1/3275; G06F 1/3296; G06F 1/20
See application file for complete search history.

(56) References Cited

U.S. PATENT DOCUMENTS

| | | | |
|---|---|---|---|
| 6,574,740 B1* | 6/2003 | Odaohhara | G06F 1/32 713/323 |
| 9,047,086 B1* | 6/2015 | Liu | G06F 1/3206 |
| 9,250,665 B2* | 2/2016 | Avkarogullari | G06F 1/206 |
| 10,101,799 B2* | 10/2018 | Huang | G06F 1/3206 |
| 10,539,998 B2* | 1/2020 | Suzuki | G06F 1/3287 |
| 2008/0201593 A1* | 8/2008 | Hori | G06F 1/3203 713/324 |

(Continued)

FOREIGN PATENT DOCUMENTS

| | | |
|---|---|---|
| JP | 2000-172387 | 6/2000 |
| JP | 2009-070328 | 4/2009 |
| JP | 2016-189109 | 11/2016 |

*Primary Examiner* — Aurel Prifti
(74) *Attorney, Agent, or Firm* — Fujitsu Patent Center

(57) ABSTRACT

A power control system includes a first power supply, a processor, a second power supply that outputs a part of a power outputted from the first power supply to the processor, a memory, a memory controller that control the memory, a third power supply that outputs the part of a power outputted from the first power supply to the memory, and a controller that includes a first control circuit and a second control circuit, the first control circuit instructs the processor to lower an operating frequency, instructs the second power supply to lower an output voltage, and instructs the memory controller to lower a frequency of access to the memory, and the second control circuit instructs the processor to raise an operating frequency, instructs the first power supply to raise a voltage, and instructs the memory controller to raise a frequency of access to the memory.

7 Claims, 16 Drawing Sheets

(56) References Cited

U.S. PATENT DOCUMENTS

| | | | |
|---|---|---|---|
| 2008/0301475 A1* | 12/2008 | Felter | G06F 1/3203 713/300 |
| 2009/0077407 A1* | 3/2009 | Akimoto | G06F 1/26 713/340 |
| 2009/0125737 A1* | 5/2009 | Brey | G06F 1/3203 713/322 |
| 2009/0161425 A1* | 6/2009 | Kim | G11C 16/26 365/185.03 |
| 2012/0079299 A1* | 3/2012 | Cepulis | G06F 1/263 713/320 |
| 2012/0144144 A1* | 6/2012 | Worthington | G06F 1/3275 711/165 |
| 2013/0147273 A1* | 6/2013 | van der lee | H02J 4/00 307/31 |
| 2013/0326252 A1* | 12/2013 | Ise | G06F 1/3234 713/323 |
| 2014/0320537 A1* | 10/2014 | Zhang | G01C 21/3635 345/659 |
| 2015/0185797 A1* | 7/2015 | Cooper | G06F 1/28 713/340 |
| 2015/0241947 A1* | 8/2015 | Allen-Ware | G06F 1/3206 713/320 |
| 2016/0179110 A1* | 6/2016 | Rotem | G06F 1/3206 327/538 |
| 2016/0181803 A1* | 6/2016 | Krishnamurthy | G06F 1/263 307/31 |
| 2016/0282928 A1* | 9/2016 | Shabbir | G06F 1/3253 |
| 2016/0291676 A1* | 10/2016 | Akimoto | G06F 1/3234 |
| 2016/0308433 A1* | 10/2016 | Shen | H02M 3/158 |
| 2017/0063088 A1* | 3/2017 | Wang | G06F 1/26 |
| 2017/0300418 A1* | 10/2017 | Reed | G06F 12/0862 |
| 2018/0203498 A1* | 7/2018 | Song | G06F 1/3225 |
| 2019/0272012 A1* | 9/2019 | Kachare | G06F 1/3287 |
| 2019/0317588 A1* | 10/2019 | Messick | G06F 1/18 |
| 2019/0354164 A1* | 11/2019 | Schlude | G06F 1/263 |
| 2020/0073467 A1* | 3/2020 | King | G06F 1/3287 |
| 2020/0142465 A1* | 5/2020 | Jenne | G06F 1/3287 |

\* cited by examiner

FIG. 4

| DEVICE | POWER MANAGEMENT VALUE |
|---|---|
| CPU | 250W - 288W |
| MEMORY | 84W - 97W |
| SSD | 84W - 97W |
| FAN | 250W - 288W |
| OTHER DEVICES | 117W - 140W |

FIG. 11

| DEVICE | CHANGE IN OPERATION STATE |
|---|---|
| CPU | RAISE/LOWER OPERATING FREQUENCY |
| MEMORY | RAISE/LOWER ACCESS FREQUENCY |
| SSD | RAISE/LOWER ACCESS FREQUENCY |
| FAN | INCREASE/DECREASE ROTATION SPEED |
| EXTERNAL I/O DEVICE | RAISE/LOWER ACCESS FREQUENCY |
| NETWORK DEVICE | INCREASE/DECREASE COMMUNICATION SPEED |
| ALARM MONITORING DEVICE | RAISE/LOWER MONITORING FREQUENCY |

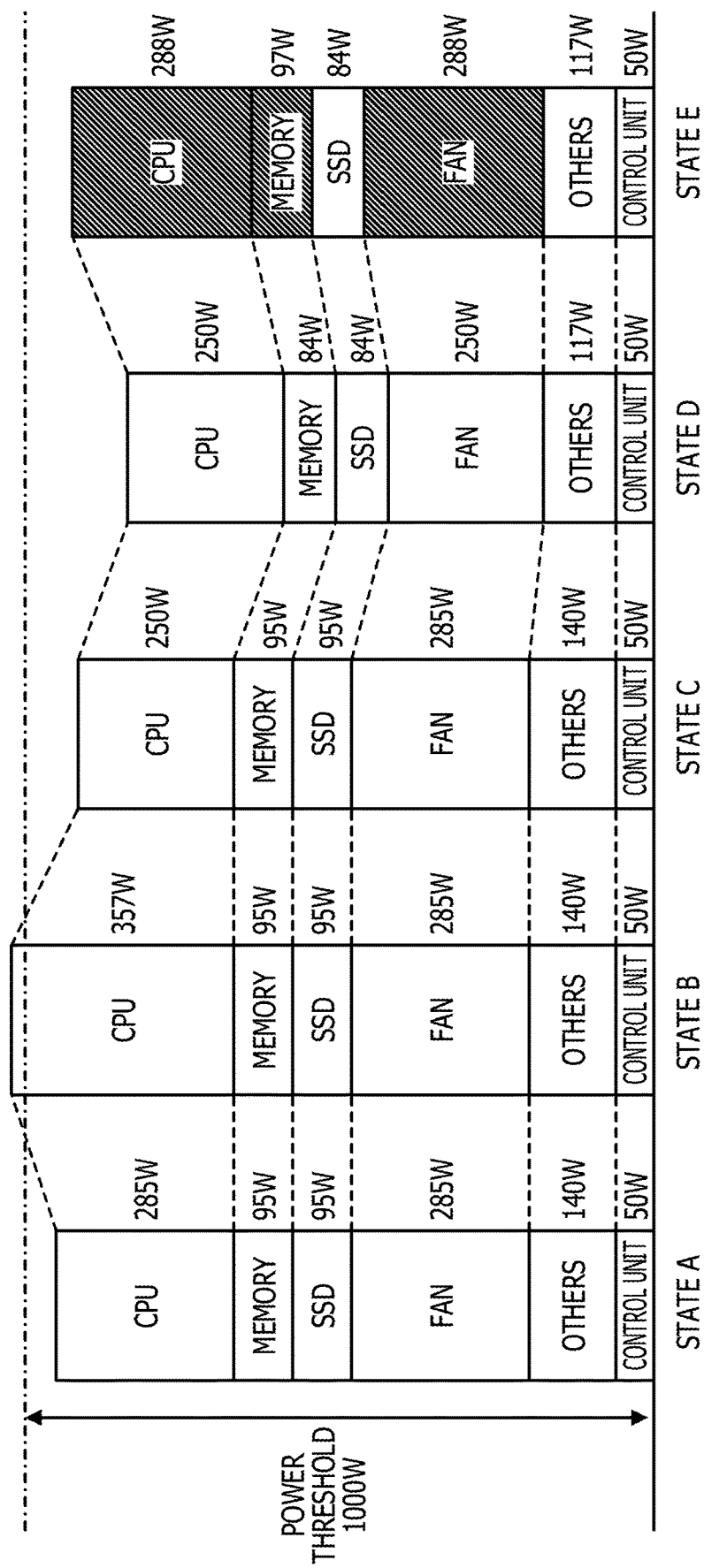

POWER CONTROL SYSTEM AND POWER CONTROL PROGRAM

CROSS-REFERENCE TO RELATED APPLICATION

This application is based upon and claims the benefit of priority of the prior Japanese Patent Application No. 2017-233580, filed on Dec. 5, 2017, the entire contents of which are incorporated herein by reference.

FIELD

The embodiments discussed herein are related to a power control system.

BACKGROUND

In a data center, constraints (for example, an upper limit value of power consumption) may be set for a power consumed by an information processing device such as a server in order to suppress power consumption.

The power output by a power supply unit (PSU) of the information processing device fluctuates depending on an operation of an application program executed by a processor such as a central processing unit (CPU). Therefore, depending on the operation condition of the application program, the power consumption of the information processing device exceeds the upper limit value. On the other hand, if the power to be supplied to a hardware device such as the CPU is limited too much, the performance of the information processing device deteriorates.

There has been technology regarding suppression of power consumption of the information processing device in which the maximum power consumption of the CPU is controlled by changing the operation mode of the CPU to suppress power consumption of a personal computer (PC). However, since this technology uses the predicted value as the maximum power consumption, whether the power consumption is properly suppressed depends on the accuracy of the prediction.

There has been technology of controlling the ratio of the power distributed to a plurality of components based on at least one operation condition of the plurality of components to which the power is supplied. However, in this technology, the power consumption of the information processing device may not be appropriately controlled, because it depends on the control of the ratio of the power allocated to the plurality of components.

The followings are reference documents.
[Document 1] Japanese Laid-open Patent Publication No. 2000-172387 and
[Document 2] Japanese Laid-open Patent Publication No. 2016-189109.

SUMMARY

According to an aspect of the embodiments, a power control system includes a first power supply, a processor, a second power supply that outputs a part of a power outputted from the first power supply to the processor, a memory, a memory controller that control the memory, a third power supply that outputs the part of a power outputted from the first power supply to the memory, and a controller that includes a first control circuit and a second control circuit, wherein when a power outputted from the first power supply exceeds a first threshold, the first control circuit instructs the processor to lower an operating frequency, instructs the second power supply to lower an output voltage, and instructs the memory controller to lower a frequency of access to the memory, and when a power outputted from the second power supply is equal to or less than a second threshold, and a power outputted from the third power supply is equal to or less than a third threshold, the second control circuit instructs the processor to raise an operating frequency, instructs the first power supply to raise a voltage, and instructs the memory controller to raise a frequency of access to the memory.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of management data stored in a data storage unit;
FIG. 11 is a diagram for explaining a change in an operation state;
FIG. 16 is a diagram illustrating an example of power control in the present embodiment.

DESCRIPTION OF EMBODIMENTS

Figure 1:
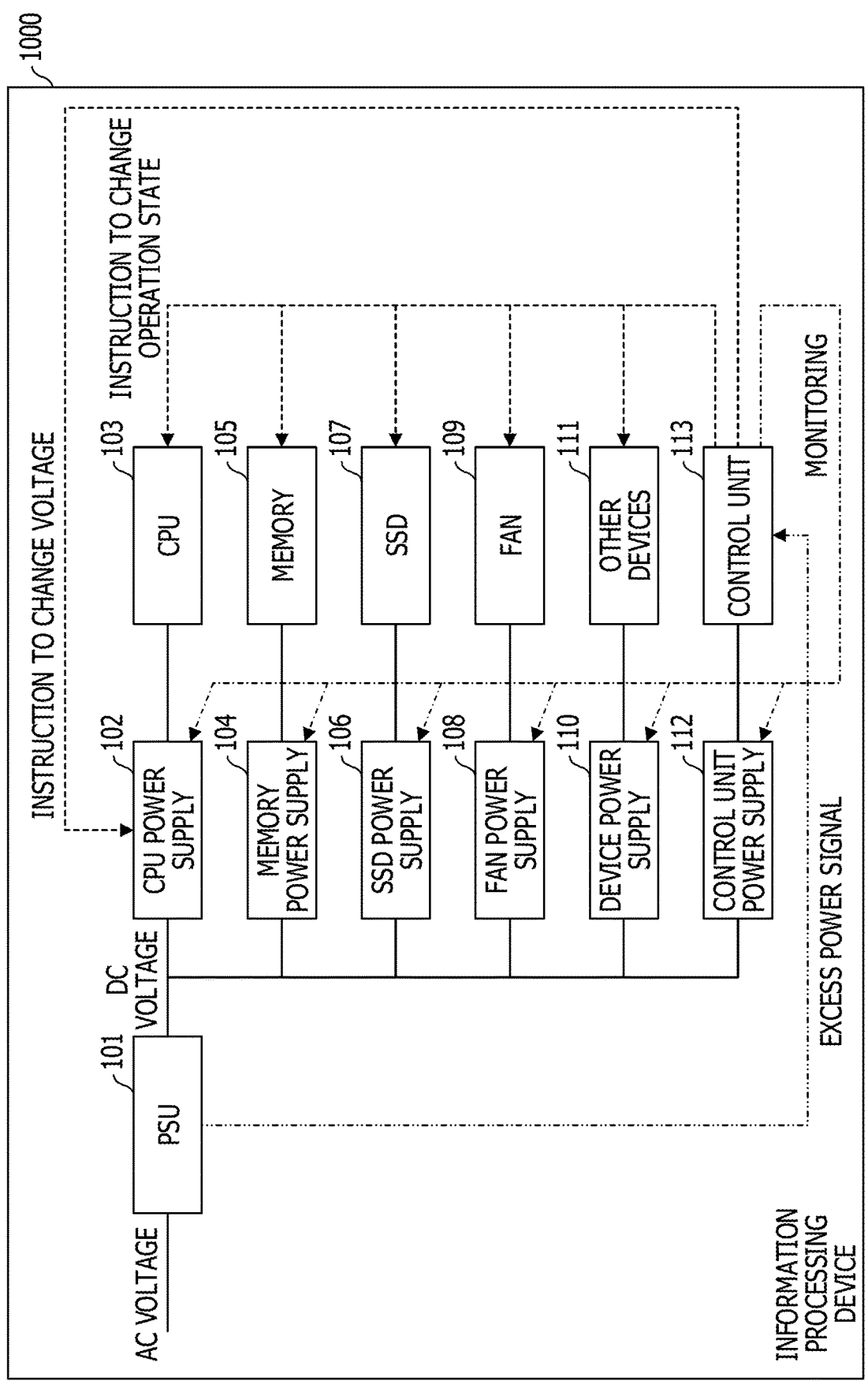
FIG. 1 is a configuration diagram of an information processing device according to a present embodiment.

FIG. 1 is a configuration diagram of an information processing device 1000 according to the present embodiment. For example, the information processing device 1000, which is a server, or PC, includes a PSU 101, a CPU power supply 102, a CPU 103, a memory power supply 104, a memory 105, a solid state drive (SSD) power supply 106, an SSD 107, a fan power supply 108, a fan 109, a device power supply 110, other devices 111, a control unit power supply 112, and a control unit 113. The memory 105 is, for example, a dynamic random access memory (DRAM). The fan 109 is a device for cooling the CPU 103. The other devices 111 include, for example, an external input/output (I/O) device, a network device, an alarm monitoring device, and so forth. The control unit 113 operates as, for example, a service processor.

The PSU 101 converts an alternating current (AC) voltage to a direct current (DC) voltage, and supplies a DC voltage to the CPU power supply 102, the memory power supply 104, the SSD power supply 106, the fan power supply 108, the device power supply 110, and the control unit power supply 112.

The CPU power supply 102 converts a DC voltage output from the PSU 101 into a voltage for the CPU 103 and outputs the converted DC voltage to the CPU 103. The memory power supply 104 converts a DC voltage output from the PSU 101 into a voltage for the memory 105 and outputs the converted DC voltage to the memory 105. The SSD power supply 106 converts a DC voltage output from the PSU 101 into a voltage for the SSD 107 and outputs the converted DC voltage to the SSD 107. The fan power supply 108 converts the DC voltage output from the PSU 101 into a voltage for the fan 109 and outputs the converted DC voltage to the fan 109. The device power supply 110 converts the DC voltage output from the PSU 101 into a voltage for the other devices 111 and outputs the converted DC voltage to the other devices 111. The control unit power supply 112 converts the DC voltage output by the PSU 101 into a voltage for the control unit 113 and outputs the converted DC voltage to the control unit 113.

In a case where the power output by the PSU 101 exceeds a threshold, the PSU 101 transmits, to the control unit 113, a signal indicating that the power output by the PSU 101 exceeds the threshold (hereinafter referred to as an excess power signal).

The control unit 113 transmits an instruction to change the voltage and an instruction to change the operation state based on an excess power signal from the PSU 101, and the output voltage and the output current of each of the CPU power supply 102, the memory power supply 104, the SSD power supply 106, the fan power supply 108, the device power supply 110 and the control unit power supply 112. The instruction to change the voltage is transmitted to the CPU 103. The instruction to change the operation state is transmitted to the CPU 103, and to at least one of the memory 105, the SSD 107, the fan 109, and the other devices 111. The instruction to change the operation state includes an instruction to suppress the operation and an instruction to promote the operation.

Figure 2:
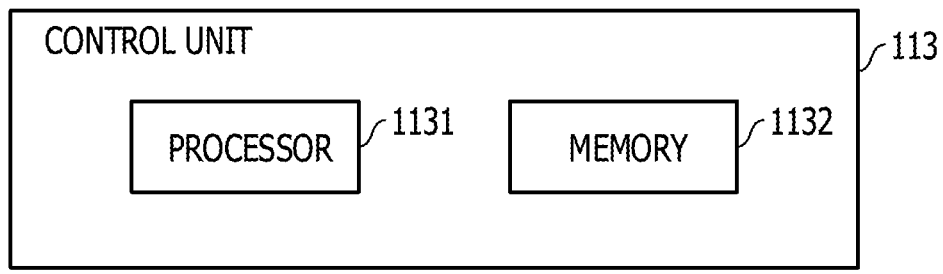
FIG. 2 is a configuration diagram of a control unit.

FIG. 2 is a configuration diagram of the control unit 113. The control unit 113 includes a processor 1131 and a memory 1132.

Figure 3:
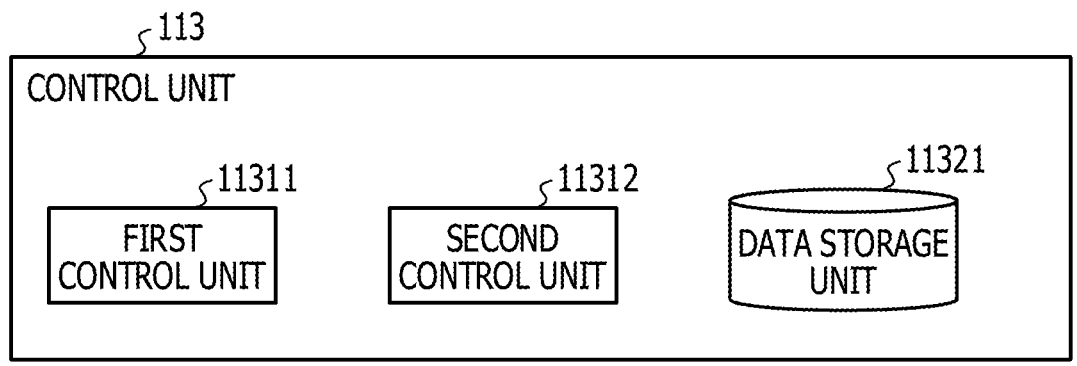
FIG. 3 is a functional block diagram of the control unit.

FIG. 3 is a functional block diagram of the control unit 113. The control unit 113 includes a first control unit 11311, a second control unit 11312, and a data storage unit 11321. The program for executing the processing of this embodiment is loaded into the memory 1132 and executed by the processor 1131, thereby making the first control unit 11311 and the second control unit 11312. The data storage unit 11321 is provided in the memory 1132, for example.

In a case where the first control unit 11311 receives the excess power signal from the PSU 101, the first control unit 11311 transmits the instruction to lower the voltage to the CPU power supply 102, and transmits the instruction to suppress the operation to the CPU 103, the memory 105, the SSD 107, the fan 109, and the other devices 111. The second control unit 11312 compares the output power calculated by the output current and the output voltage of each of the CPU power supply 102, the memory power supply 104, the SSD power supply 106, the fan power supply 108 and the device power supply 110 with the lower limit value and the upper limit value stored in the data storage unit 11321. In a case where the output power of each power supply satisfies the predetermined condition, the second control unit 11312 transmits an instruction to raise the voltage to the CPU power supply 102, and transmits an instruction to promote the operation to the CPU 103 and to at least one of the memory 105, the SSD 107, the fan 109, the other devices 111 and the control unit 113 (in this embodiment, to the memory 105 and the fan 109).

FIG. 4 is a diagram illustrating an example of management data stored in the data storage unit 11321. In the example of FIG. 4, the power management value for each device other than the control unit 113 is stored. The power management values include a lower limit value and an upper limit value of power. In the present embodiment, control is performed so that the power value of each device falls between the lower limit value and the upper limit value.

Figure 5:
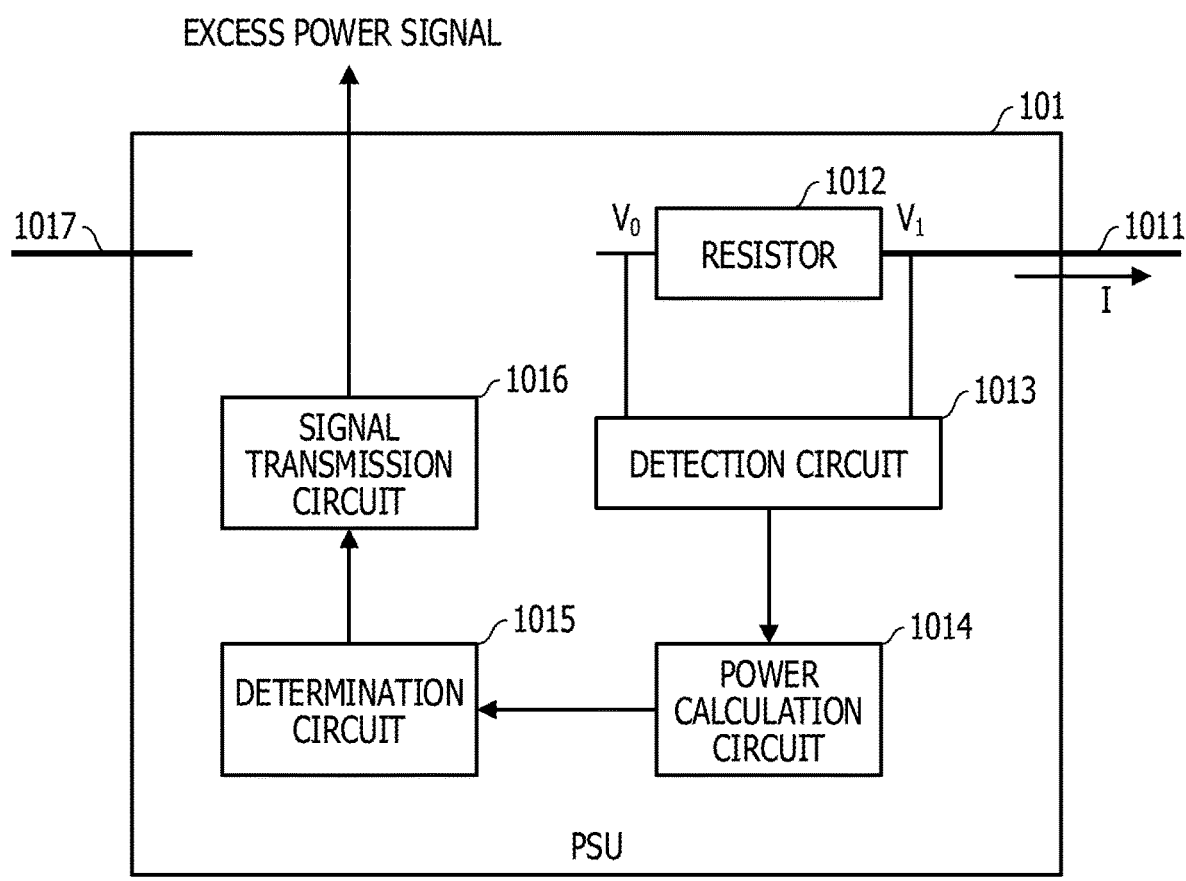
FIG. 5 is a configuration diagram of a PSU.

FIG. 5 is a configuration diagram of the PSU 101. The PSU 101 includes an output line 1011, a resistor 1012, a detection circuit 1013, a power calculation circuit 1014, a determination circuit 1015, a signal transmission circuit 1016, and an input line 1017.

The resistor 1012 is set in the output line 1011. The voltage value on the output side of the resistor 1012 is $V_1$, and the voltage value on the inner side of the resistor 1012 is $V_0$. The current value of the output line 1011 is I. The detection circuit 1013 detects the output voltage and the output current of the PSU 101. The output voltage is $V_1$, and the output current I is calculated by $(V_0-V_1)/R$. R is a resistance value of the resistor 1012. The power calculation circuit 1014 calculates the output power $P_1$ by $V_1*(V_0-V_1)/R$. The determination circuit 1015 determines whether to output an excess power signal based on the comparison between the output power $P_1$ and the power threshold $P_0$. The signal transmission circuit 1016 transmits an excess power signal to the control unit 113 according to the determination result by the determination circuit 1015. The AC voltage is input from the input line 1017.

Next, the operation of the information processing device 1000 according to the present embodiment will be described.

Figure 6:
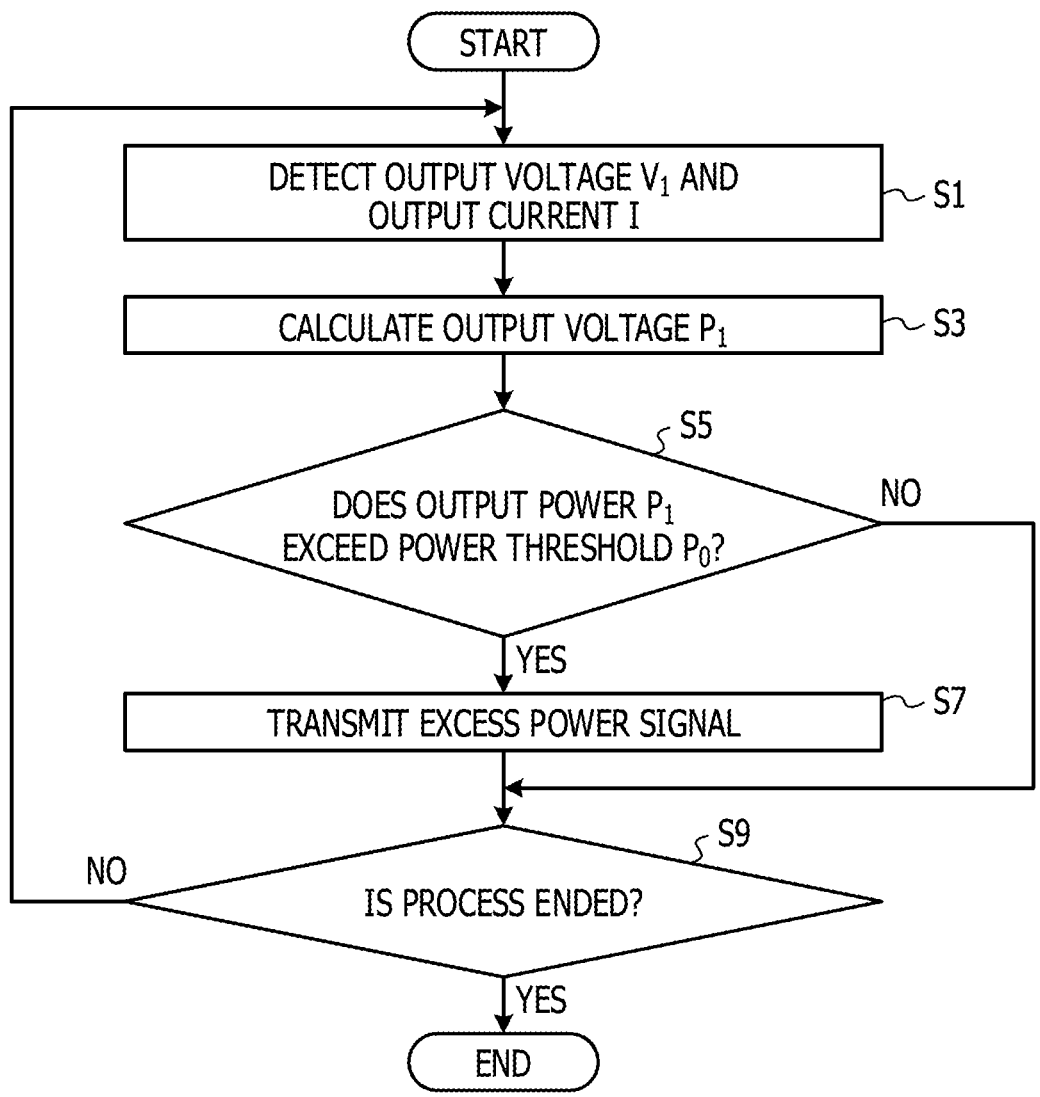
FIG. 6 is a diagram illustrating a processing flow of a process performed by the PSU.

FIG. 6 is a diagram illustrating a processing flow of a process performed by the PSU 101.

The detection circuit 1013 detects the output voltage $V_1$ and the output current I of the PSU 101 (step S1 in FIG. 6). As described above, the output current I is calculated by $(V_0-V_1)/R$.

The power calculation circuit 1014 calculates the output power $P_1$ based on the output voltage $V_1$ and the output current I detected by the detection circuit 1013 (step S3). As described above, the output power $P_1$ is calculated by $V_1*(V_0-V_1)/R$.

The determination circuit 1015 determines whether the output power $P_1$ calculated by the power calculation circuit 1014 exceeds the power threshold $P_0$ (for example, 1000 W (watts)) (step S5).

In a case where the output power $P_1$ does not exceed the power threshold $P_0$ (step S5: "No" route), the process proceeds to step S9. On the other hand, in a case where the output power $P_1$ exceeds the power threshold $P_0$ (step S5: "Yes" route), the signal transmission circuit 1016 transmits an excess power signal to the control unit 113 (step S7).

The detection circuit 1013 determines whether to end the process (for example, an instruction to stop the information processing device 1000 is input) (Step S9). In a case where the process is not to be ended (step S9: "No" route) the process proceeds to step S1. On the other hand, in a case where the process is to be ended (step S9: "Yes" route), the process ends.

As described above, in the present embodiment, since the PSU 101 itself monitors the output power, it is possible to construct a power monitoring mechanism without providing a module or the like for monitoring output power separately from the PSU 101. As described above, the output power may be obtained with high accuracy.

Figure 7:
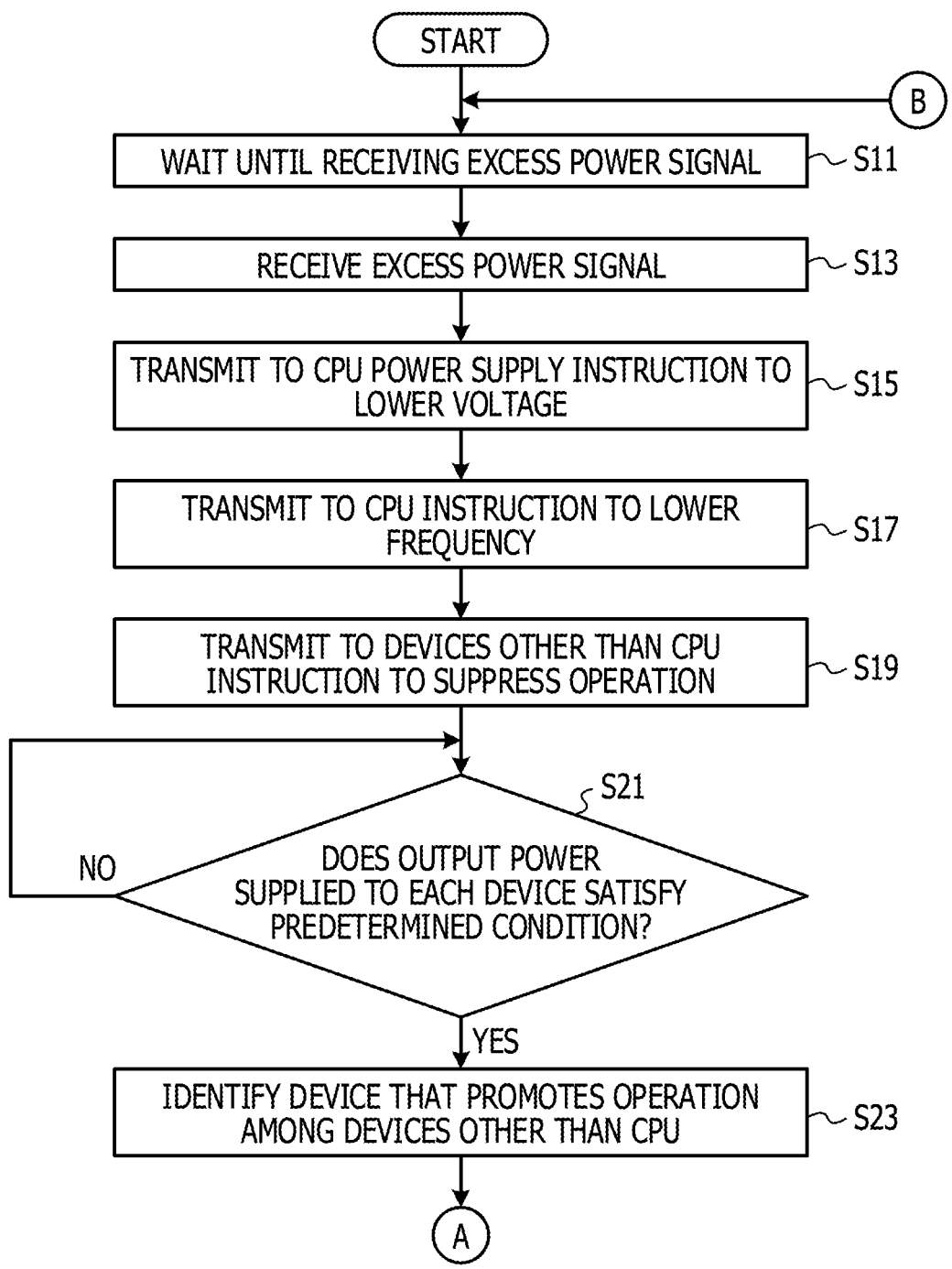
FIG. 7 is a diagram illustrating a processing flow of a process performed by the control unit.

FIG. 7 is a diagram illustrating a processing flow of a process performed by the control unit 113.

The first control unit 11311 waits until it receives an excess power signal from the PSU 101 (step S11 in FIG. 7), and receives the excess power signal from the PSU 101 (step S13).

The first control unit 11311 transmits to the CPU power supply 102 an instruction to lower the voltage (step S15).

Figure 8:
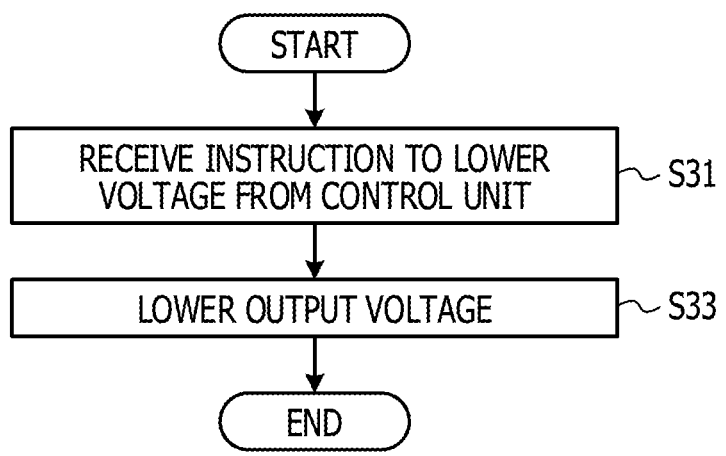
FIG. 8 is a diagram illustrating a processing flow of a process performed by a CPU power supply that has received an instruction to lower a voltage.

The process performed by the CPU power supply 102 that has received the instruction to lower the voltage will be described. FIG. 8 is a diagram illustrating a processing flow of a process performed by the CPU power supply 102 that has received the instruction to lower the voltage.

The CPU power supply 102 receives from the control unit 113 the instruction to lower the voltage (step S31 in FIG. 8).

The CPU power supply 102 lowers the voltage that the CPU power supply 102 outputs to the CPU 103 (step S33). Then, the process ends. The CPU power supply 102 lowers the voltage, for example, until instructed by the control unit 113 to stop the voltage reduction.

Returning to the explanation of FIG. 7, the first control unit 11311 transmits to the CPU 103 the instruction to lower the frequency (step S17).

Figure 9:
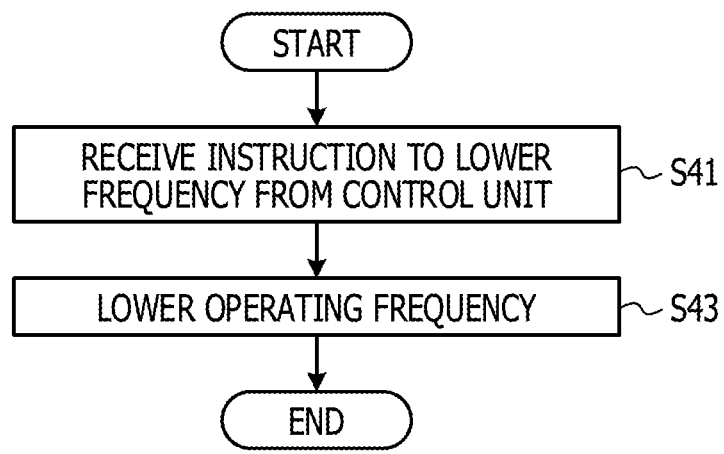
FIG. 9 is a diagram illustrating a processing flow of a process performed by the CPU that has received an instruction to lower a frequency.

The process executed by the CPU 103 that has received the instruction to lower the frequency will be described. FIG. 9 is a diagram illustrating a processing flow of a process executed by the CPU 103 that has received the instruction to lower the frequency.

The CPU 103 receives from the control unit 113 the instruction to lower the frequency (step S41 in FIG. 9).

The CPU 103 lowers the operating frequency (also referred to as a clock frequency) by, for example, a dynamic voltage and frequency scaling (DVFS) or the like (step S43). Then, the process ends. The CPU 103 lowers the operating frequency until, for example, the control unit 113 instructs the CPU 103 to stop the frequency reduction.

Returning to the explanation of FIG. 7, the output power from the CPU power supply 102 decreases by the process of steps S15 and S17. When validating that the power of the CPU 103 is equal to or lower than the lower limit value illustrated in FIG. 4, the first control unit 11311 transmits to devices other than the CPU 103 (for example, the memory 105, the SSD 107, the fan 109, and the other devices 111) the instruction to suppress the operations (step S19). The instruction to suppress the operation is an instruction for decreasing the current by suppressing the operation of the device as in the instruction to lower the frequency. At the time of step S19, the first control unit 11311 may instruct the CPU power supply 102 to stop the voltage reduction, and may instruct the CPU 103 to stop the frequency reduction.

Figure 10:
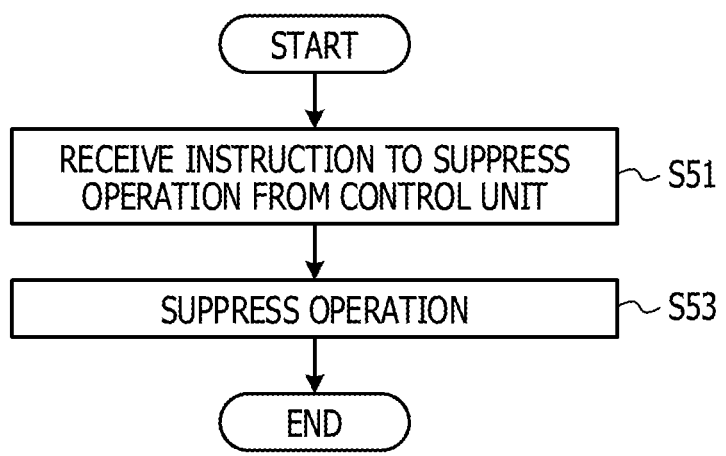
FIG. 10 is a diagram illustrating a processing flow of a process performed by a device that has received an instruction to suppress an operation.

The process performed by the device that has received the instruction to suppress the operation will be described. FIG. 10 is a diagram illustrating a processing flow of a process performed by a device that has received an instruction to suppress an operation. Although the process by the fan 109 will be described as an example, similar processing is performed for devices other than the fan 109.

The fan 109 receives from the control unit 113 the instruction to suppress the operation (step S51 in FIG. 10).

The fan 109 suppresses the operation (for example, the rotation speed of the fan 109 is decreased) (Step S53). Then, the process ends. The fan 109 suppresses the operation until, for example, the control unit 113 instructs the fan 109 to stop the operation suppression.

FIG. 11 is a diagram for explaining a change in an operation state. In the present embodiment, acceleration of the operation and suppression of the operation are performed as changes in the operation state. For the CPU 103, the operating frequency is raised as operation promotion, and the operating frequency is lowered as operation suppression. For the memory 105, as the operation is promoted, the frequency of access by the memory controller is raised, and the frequency of access by the memory controller is lowered as operation suppression. For the SSD 107, the frequency of access by the controller of the SSD 107 is raised as operation promotion, and the frequency of access by the controller of the SSD 107 is lowered as operation suppression. For the external I/O device, the frequency of access is increased as operation promotion, and the frequency of access is decreased as operation suppression. For the network device, the communication speed is increased as operation promotion, and the communication speed is decreased as operation suppression. For the alarm monitoring device, the monitoring frequency is increased as operation promotion, and the monitoring frequency is decreased as operation suppression. The external I/O device is, for example, a peripheral component interconnect (PCI) card. The network device is, for example, a router or a switch. Practically, the network device is installed outside the information processing device 1000. The alarm monitoring device monitors the occurrence of an alarm issued at the time of an abnormality and notifies the control unit 113 of the abnormality.

Returning to the explanation of FIG. 7, by the process of step S19, the output power from each of the memory power supply 104, the SSD power supply 106, the fan power supply 108, and the device power supply 110 decreases. The second control unit 11312 monitors the output power from each of the CPU power supply 102, the memory power supply 104, the SSD power supply 106, the fan power supply 108, and the device power supply 110, and determine whether the output power supplied to each device (in this case, the CPU 103, the memory 105, the SSD 107, the fan 109, and other devices 111) satisfies a predetermined condition (step S21). The predetermined condition is a condition that the output power supplied to each device is equal to or less than the lower limit value illustrated in FIG. 4.

In a case where the output power supplied to each device does not satisfy the predetermined condition (step S21: "No" route), the process returns to step S21. On the other hand, in a case where the output power supplied to each device satisfies the predetermined condition (step S21: "Yes" route), the second control unit 11312 performs the following process. For example, the second control unit 11312 identifies a device that promotes the operation among devices other than the CPU 103 (step S23). In the present embodiment, the memory 105 and the fan 109, which are devices having a relatively large influence on the performance of the CPU 103, are identified. Then, the process proceeds to step S25 in FIG. 12 via the terminal A. At the time of step S23, the first control unit 11311 may instruct a device other than the CPU 103 to stop the operation suppression.

Figure 12:
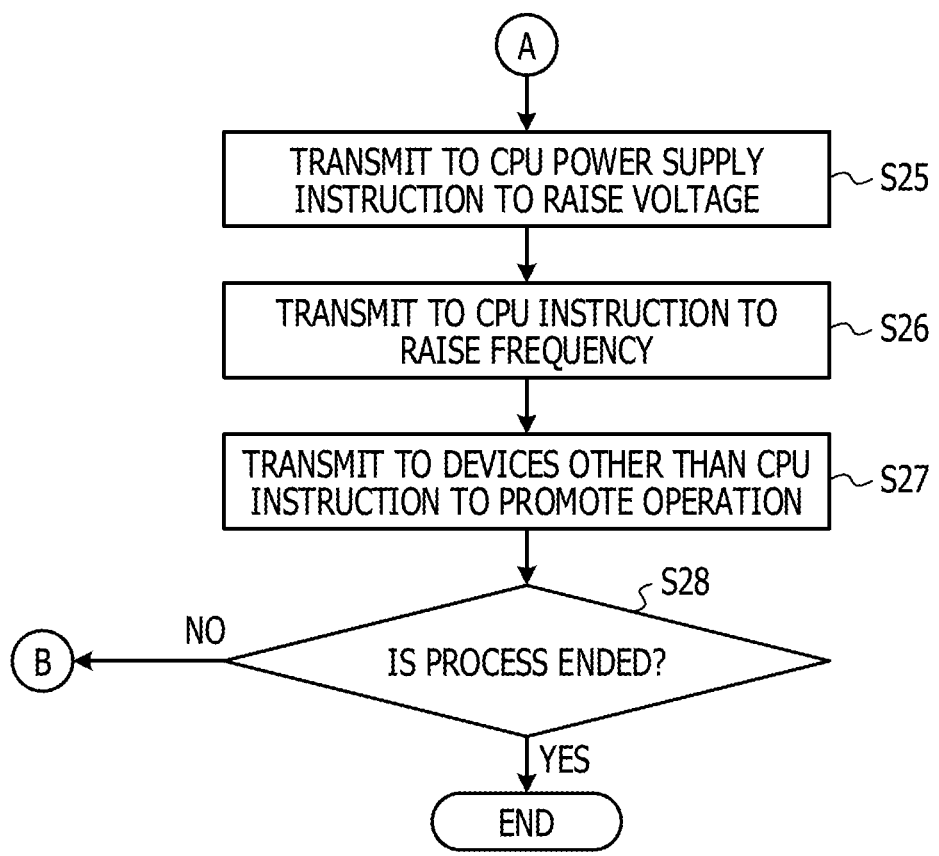
FIG. 12 is a diagram illustrating a processing flow of a process performed by the control unit.

The process proceeds to the description in FIG. 12, and the second control unit 11312 transmits to the CPU power supply 102 an instruction to raise the voltage (step S25 in FIG. 12).

Figure 13:
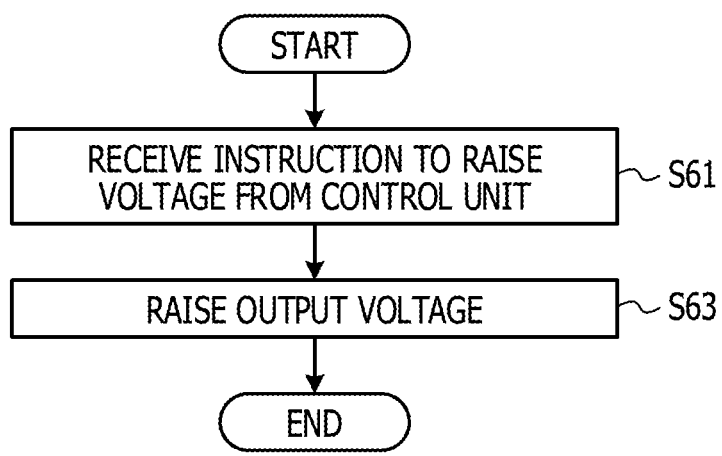
FIG. 13 is a diagram illustrating a processing flow of a process performed by the CPU power supply that has received an instruction to raise a voltage.

The process performed by the CPU power supply 102 that has received the instruction to raise the voltage will be described. FIG. 13 is a diagram illustrating a processing flow of a process performed by the CPU power supply 102 which received the instruction to raise the voltage.

The CPU power supply 102 receives from the control unit 113 the instruction to raise the voltage (step S61 in FIG. 13).

The CPU power supply 102 raises the voltage that the CPU power supply 102 outputs to the CPU 103 (step S63). Then, the process ends. The CPU power supply 102 raises the voltage until, for example, the control unit 113 instructs the CPU power supply 102 to stop the voltage increase or until the control unit 113 instructs the CPU power supply 102 to lower the voltage. The instruction to stop the voltage increase is given, for example, in a case where the output power from the CPU power supply 102 reaches the upper limit value.

Returning to the explanation of FIG. 12, the second control unit 11312 transmits to the CPU 103 an instruction to raise the frequency (step S26).

Figure 14:
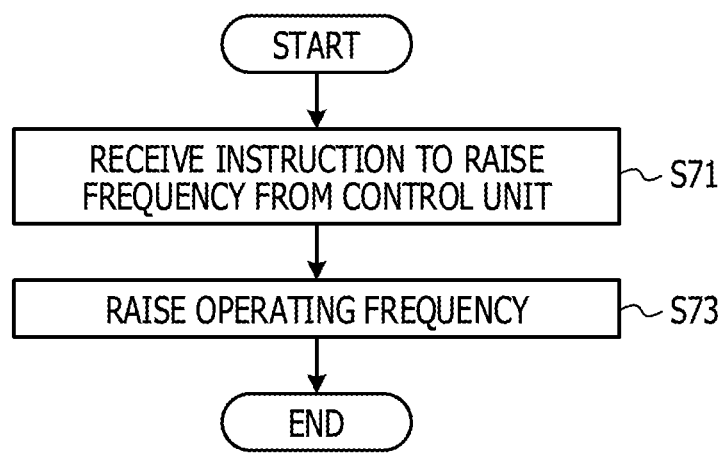
FIG. 14 is a diagram illustrating a processing flow of a process performed by the CPU that receives an instruction to raise a frequency.

The process executed by the CPU 103 that has received the instruction to raise the frequency will be described. FIG. 14 is a diagram illustrating a processing flow of a process executed by the CPU 103 that has received the instruction to raise the frequency.

The CPU 103 receives from the control unit 113 the instruction to raise the frequency (step S71 in FIG. 14).

The CPU 103 raises the operating frequency (step S73). Then, the process ends. Then, the CPU 103 raises the operating frequency until, for example, the control unit 113 instructs the CPU 103 to stop the frequency increase, or the control unit 113 instructs the CPU 103 to lower the frequency. The instruction to stop the frequency increase is given, for example, in a case where the output power from the CPU power supply 102 reaches the upper limit value.

Returning to the description of FIG. 12, the second control unit 11312 transmits the instruction to promote the operation to the devices identified in step S23 (in this case, the memory 105 and the fan 109) (step S27). As in the instruction to raise the frequency, the instruction to promote the operation is an instruction for promoting the operation of the device, and the current is increased by promoting the operation.

Figure 15:
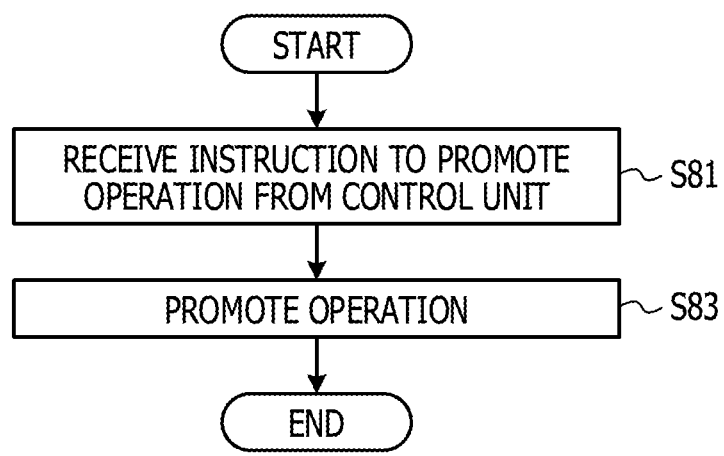
FIG. 15 is a diagram illustrating a processing flow of a process performed by the device that has received an instruction to promote an operation.

The process performed by the device that has received the instruction to promote the operation will be described. FIG. 15 is a diagram illustrating a processing flow of a process performed by the device that has received an instruction to promote an operation. Although the process by the fan 109 will be described as an example, the same process is performed for devices other than the fan 109.

The fan 109 receives from the control unit 113 an instruction to promote the operation (step S81 in FIG. 15).

The fan 109 promotes the operation (for example, increases the rotation speed of the fan 109) (Step S83). Then, the process ends. The fan 109 promotes the operation until, for example, the control unit 113 instructs the fan 109 to stop the operation promotion, or the control unit 113 instructs the fan 109 to suppress the operation. The instruction to stop the operation promotion is given, for example, in a case where the output power from the fan power supply 108 reaches the upper limit value.

Returning to the explanation of FIG. 12, the first control unit 11311 determines whether to end the process (for example, an instruction to stop the information processing device 1000 is input) (Step S28). In a case where the process is not to be ended (step S28: "No" route), the process returns to step S11 in FIG. 7 via the terminal B. On the other hand, in a case where the process is to be ended (step S28: "Yes" route), the process ends.

FIG. 16 is a diagram illustrating an example of power control in the present embodiment. In FIG. 16, the power of each device in each state is illustrated. The power of the control unit 113 does not vary and 50 W. The state transits in order of A, B, C, D and E. In the state A, the power of the CPU 103 is 285 W, the power of the memory 105 is 95 W, the power of the SSD 107 is 95 W, the power of the fan 109 is 285 W, the power of the other devices 111 is 140 W, the power of the control unit 113 is 50 W, and the total power is 950 W. Since the total power is smaller than the power threshold (in this case, 1000 W), the PSU 101 does not transmit an excess power signal.

The state transits to the state B as the power of the CPU 103 increases in the state A. The consumption of power increases as the current increases due to, for example, an increase in the processing load of the CPU 103. In the state B, the power of the CPU 103 is 357 W, and the power of each the devices other than the CPU 103 is the same as the power in the state A, whereby the total power is 1022 W. Since the total power is greater than the power threshold, the PSU 101 transmits an excess power signal.

Upon receiving the excess power signal, the control unit 113 lowers the voltage of the CPU 103, and lowers the operating frequency of the CPU 103. The state transits to the state C as the power of CPU 103 decreases in state B. In the state C, the power of the CPU 103 is 250 W, and the power of each of the devices other than the CPU 103 is the same as the power in the state B, whereby the total power is 915 W.

When it is determined that the power of the CPU 103 has become lower than the lower limit value, the operation of each of the memory 105, the SSD 107, the fan 109, and the other devices 111 is suppressed. The state transits to the state D by decreasing the power of each of the devices other than the CPU 103 in the state C. In the state D, the power of the CPU 103 is 250 W, which is the same as the power in the state C. The power of the memory 105 is 84 W, the power of the SSD 107 is 84 W, the power of the fan 109 is 250 W, the power of the other devices 111 is 117 W, and the power of the control unit 113 is 50 W, whereby the total power is 835 W.

Since the power of each device has become lower than the lower limit value, the frequency of the CPU 103 is raised, and the operations of the memory 105 and the fan 109 both of which have a relatively large influence on the computing performance of the CPU 103 are promoted. The output voltage to the CPU 103 is raised. Since the power of each of the CPU 103, the memory 105 and the fan 109 increases in the state D, the state transits to the state E. In the state E, the power of the CPU 103 is 288 W, the power of the memory 105 is 97 W, and the power of the fan 109 is 288 W. The power of each of the SSD 107, the other devices 111 and the control unit 113 is the same as that in the state D. The total power is 924 W, which is smaller than the power threshold.

By performing the above control, it is possible to obtain a peak cut of power consumed by the information processing device 1000. As a result, it is possible to reduce electric power charges, and it is possible to avoid occurrence of thermal destruction and the like due to the excessive operation of each hardware device.

It is possible to detect excess of power with high accuracy by calculating power not based on predicted values but based on measured values. As a result, it is possible to utilize the supply able power without waste.

When the frequency of the CPU 103 is low, it is probable that the use frequency of the memory 105 is low, and there be no problem even if the rotation speed of the fan 109 is small. Therefore, when the frequency of the CPU 103 is lowered, the operation of each of the devices other than the CPU 103 is also suppressed, so that it is possible to avoid wasteful consumption of power.

On the other hand, in a case where there is enough power to use, the operation is promoted only in a device having a relatively large influence on the calculation performance of the CPU 103 in accordance with the increase in frequency of the CPU 103, so that it is possible to effectively improve the performance of the information processing device 1000 while suppressing power consumption.

As described above, an embodiment is described. However, the embodiment discussed herein is not limited thereto. For example, the functional block configuration of the control unit 113 described above may not match the actual program module configuration in some cases.

The above-described data configuration is an example, and it does not have to be configured as described above. In the processing flow, if the processing result does not change, it is also possible to change the order of the process. The process may be performed in parallel.

Patterns of distribution ratio of the power to each device are defined in advance, and the control unit 113 selects one of the patterns according to the state, so that the operation state of each device may be controlled.

In the example described above, a device for promoting the operation is selected from the viewpoint of the calculation performance of the CPU 103. Control may be performed so as to maximize the performance of each of the devices other than the CPU 103.

The embodiments discussed herein may be summarized as follows.

The power control system according to a first aspect of the present embodiment includes (A) a power supply unit (the PSU 101 in the embodiment is an example of the power supply unit), (B) a processor (the CPU 103 in the embodiment is an example of the processor), (C) a memory (the memory 105 in the embodiment is an example of the above memory), and (D) a control device (the control unit 113 in the embodiment is an example of the above control device). The above control device includes (d1) in a case where a power output by the power supply unit exceeds a first threshold, a first control unit that instructs the processor to lower an operating frequency, instructs a power supply outputting a power output by the power supply unit to the processor to lower a voltage, and instructs a controller of the memory to lower a frequency of access to the memory (the first control unit 11311 in the embodiment is an example of the first control unit), and (d2) in a case where the power output to the processor is equal to or less than a second threshold, and a power output to the memory is equal to or less than a third threshold, a second control unit that instructs the processor to raise an operating frequency, instructs the power supply to raise a voltage, and instructs the controller of the memory to raise a frequency of access to the memory (the second control unit 11312 in the embodiment is an example of the second control unit).

Since the power of the memory that has a relatively large influence on the operation of the processor is also controlled, it is possible to effectively enhance the performance of the information processing device under the constraint of power.

The power control system may further include (E) a cooling fan. The first control unit (d11) may further transmit to the cooling fan an instruction to decrease a rotation speed, and the second control unit (d21) may further transmit to the cooling fan an instruction to increase the rotation speed in a case where a power output to the cooling fan is equal to or less than a fourth threshold.

Since the power of the cooling fan that has a relatively large influence on the operation of the processor is also controlled, it is possible to more effectively enhance the performance of the information processing device under the constraint of power.

The present power control system may further include (F) an auxiliary storage device. The first control unit (d12) may further transmit to a controller of the auxiliary storage device an instruction to lower a frequency of access to the auxiliary storage device.

It is possible to suppress power output by the power supply unit.

The power supply unit may include (a1) a determination unit that determines whether the power output by the power supply unit exceeds a first threshold (the determination circuit 1015 in the embodiment is an example of the determination unit), and (a2) in a case where the determination unit determines that the power output by the power supply unit exceeds the first threshold, an output unit that transmits to the control device a signal indicating that the power output by the power supply unit exceeds the first threshold (the signal transmission circuit 1016 in the embodiment is an example of the output unit).

It is possible to construct a power monitoring mechanism without providing a power monitoring module or the like separately from the power supply unit.

The power supply unit may include (a3) a calculation unit that calculates the power output by the power supply unit from a voltage and a current output by the power supply unit (the power calculation circuit 1014 in the embodiment is an example of the calculation unit).

It is possible to more accurately calculate the power output by the power supply unit.

The second threshold may be a lower limit value of a power output to the processor, and the third threshold may be a lower limit value of the power output to the memory.

The power supply unit according to a second aspect of the present embodiment includes (G) a determination unit that determines whether a power output by the power supply unit exceeds a threshold (the determination circuit 1015 in the embodiment is an example of the determination unit), and (H) in a case where the determination unit determines that the power output by the power supply unit exceeds the threshold, an output unit that transmits a signal indicating that the power output by the power supply unit has exceeded the threshold to a control device that controls a device operating with a power output by the power supply unit (the signal transmission circuit 1016 in the embodiment is an example of the output unit).

A power monitoring module or the like may not be provided separately from the power supply unit.

The power supply unit may further includes (I) a calculation unit that calculates the power output by the power supply unit from a voltage and a current output by the power supply unit (the power calculation circuit 1014 in the embodiment is an example of the calculation unit).

It is possible to construct a power monitoring mechanism without providing a power monitoring module or the like separately from the power supply unit.

A power control method according to a third aspect of the present embodiment includes (J) in a case where a power output by a power supply unit exceeds a first threshold, instructing the processor of the information processing device to lower an operating frequency, instructing a power supply outputting a power output by the power supply unit of the information processing device to the processor of the information processing device to lower a voltage, and instructing a controller of a memory of the information processing device to lower a frequency of access to the memory, and (K) in a case where the power output to the processor of the information processing device is equal to or less than a second threshold, and a power output to the memory is equal to or less than a third threshold, instructing the processor of the information processing device to raise an operating frequency, instructing the power supply to raise a voltage, and instructing the controller of the memory to raise a frequency of access to the memory.

It is possible to create a program for causing a processor to execute the process according to the above method, and the program is stored in, for example, a computer-readable storage medium such as a flexible disk, a CD-ROM, a magneto-optical disk, a semiconductor memory, and a hard disk or the like, or a storage device. The intermediate processing result is temporarily stored in a storage device such as a main memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A power control system comprising:
a first power supply;
a processor;
a second power supply that outputs a part of a power outputted from the first power supply to the processor;
a memory;
a memory controller that control the memory;
a third power supply that outputs the part of a power outputted from the first power supply to the memory; and
a controller that includes a first control circuit and a second control circuit, wherein
when a power outputted from the first power supply exceeds a first threshold, the first control circuit instructs the processor to lower an operating frequency, instructs the second power supply to lower an output voltage, and instructs the memory controller to lower a frequency of access to the memory, and
when a power outputted from the second power supply is equal to or less than a second threshold, and a power outputted from the third power supply is equal to or less than a third threshold, the second control circuit instructs the processor to raise an operating frequency, instructs the first power supply to raise a voltage, and instructs the memory controller to raise a frequency of access to the memory.

2. The power control system according to claim 1, further comprising:
a cooling fan,
wherein the first control circuit further transmits to the cooling fan an instruction to decrease a rotation speed, and
wherein the second control circuit further transmits to the cooling fan an instruction to increase the rotation speed in a case where a power output to the cooling fan is equal to or less than a fourth threshold.

3. The power control system according to claim 1, further comprising:
an auxiliary storage,
wherein the first control circuit further transmits to a controller of the auxiliary storage an instruction to lower a frequency of access to the auxiliary storage.

4. The power control system according to claim 1, wherein the power supply includes
a determination circuit that determines whether the power output by the power supply exceeds the first threshold, and
in a case where the determination circuit determines that the power output by the power supply exceeds the first threshold, an output circuit that transmits to the controller a signal indicating that the power output by the power supply exceeds the first threshold.

5. The power control system according to claim 4, wherein the power supply includes
a calculation circuit that calculates the power output by the power supply from a voltage and a current output by the power supply.

6. The power control system according to claim 1, wherein the second threshold is a lower limit value of the power outputted form the first power supply, and the third threshold is a lower limit value of the power output to the memory.

7. A non-transitory computer readable recording medium that stores therein a power control program, the power control program causing a second processor of an information processing apparatus to execute operation of:
when a power outputted from a power supply of the information processing apparatus exceeds a first threshold,
decreasing an operating frequency of a first processor of the processing apparatus,
decreasing a voltage of a power supplied to the first processor, and
decreasing a frequency of access to a memory of the information processing apparatus, and
when a power output to the first processor is equal to or less than a second threshold, and a power output to the memory is equal to or less than a third threshold,
increasing the operating frequency of the first processor,
increasing the voltage of the power supplied to the first processor, and
increasing the frequency of access to the memory.

* * * * *